United States Patent [19]

Paritsky et al.

[11] Patent Number: 5,771,091
[45] Date of Patent: Jun. 23, 1998

[54] SENSOR AND A METHOD FOR MEASURING DISTANCES TO, AND/OR PHYSICAL PROPERTIES OF, A MEDIUM

[75] Inventors: Alexander Paritsky, Jerusalem; Alexander Kots, Ashdod, both of Israel

[73] Assignee: Phone-Or Ltd, Yehud, Israel

[21] Appl. No.: 567,636

[22] Filed: Dec. 5, 1995

[30] Foreign Application Priority Data

Dec. 7, 1994 [IL] Israel ......................................... 111913

[51] Int. Cl.⁶ ............................ G01C 3/08; G01B 11/24; G01J 1/04
[52] U.S. Cl. ..................................... 356/4.01; 250/227.11; 250/227.24; 250/227.25; 356/4.07; 356/575
[58] Field of Search ................................... 356/4.01, 4.07, 356/28, 28.5, 375; 250/227.11, 227.24, 227.25

[56] References Cited

U.S. PATENT DOCUMENTS

| | | |
|---|---|---|
| 3,792,928 | 2/1974 | Poilleux . |
| 4,293,188 | 10/1981 | McMahon . |
| 4,479,717 | 10/1984 | Cornillault ............................... 356/375 |
| 4,518,857 | 5/1985 | McMahon . |
| 4,766,323 | 8/1988 | Franklin et al. . |
| 4,848,871 | 7/1989 | Seidel . |
| 4,943,157 | 7/1990 | Reding . |
| 4,946,275 | 8/1990 | Bartholomew . |
| 5,013,150 | 5/1991 | Watts et al. ......................... 250/227.11 |
| 5,089,697 | 2/1992 | Prohaska . |
| 5,450,203 | 9/1995 | Penkethman ............................ 356/375 |

FOREIGN PATENT DOCUMENTS

| | | |
|---|---|---|
| 26 20 914 | 11/1977 | European Pat. Off. . |
| 0 214 040 | 3/1987 | European Pat. Off. . |
| 0 459 504 | 12/1991 | European Pat. Off. . |

OTHER PUBLICATIONS

Patent Abstracts of Japan, vol. 7, No. 188 (P–217) [1333], Aug. 17, 1983 & JP 58 090173 A (Tokyo Keiki K.K.), May 28, 1993, Abstract.

*Primary Examiner*—Stephen C. Buczinski
*Attorney, Agent, or Firm*—Townsend and Townsend and Crew LLP

[57] ABSTRACT

A sensor for sensing the distances to a medium and/or the physical properties thereof, including a housing, at least one pair of optical fibers, each having an input end portion and an output end portion, the input end portion of a first fiber being connectable to a source of light and the output end portion of a second fiber being connectable to a light intensity measuring device. The sensor further includes the input and output end portions, wherein each of the output portion of the first fiber and input end portion of the second fiber has an axis and a rim, the rim being cut at an angle Θ with respect to the axis and being affixedly located in a plane at least in proximity to, and facing, each other, so as to include an angle α between the axes thereof. The arrangement is such that, upon operation, the light emerging from the output end portion of the first fiber impinges on a surface of a medium, at an angle of incidence β, and wherein β=ƒ(α,Θ). A method of at least indirectly measuring distances to, and/or physical properties of a medium, is also provided.

18 Claims, 3 Drawing Sheets

SENSOR AND A METHOD FOR MEASURING DISTANCES TO, AND/OR PHYSICAL PROPERTIES OF, A MEDIUM

The present invention relates to sensors and a method of measuring distances to, and/or physical properties of, a medium. More particularly, the present invention relates to fiber optic sensors and to methods utilizing such sensors for a vast range of measurements.

The term "measurement of distances to, and/or physical properties of, a medium", as used herein, is intended to encompass the performance of measurements or the sensing of micromovements, which can be utilized to construct, e.g., microphones, hydrophones, accelerometers, pressure/vacuum gauges, temperature sensors, sensors measuring thickness of microcoatings surface characteristics of silicon wafers, and the like.

More than twenty years have passed since optical fibers were first used in physics, measurements and industry. They allow for the possibility of implementing very simple and effective optical measuring methods in a wide range of relatively new technical fields, such as microelectronics, micromechanics and high accuracy measurements to other fields of industry, cars, building etc.

All different methods and devices for fiber optical measurements may be grouped into the following categories of measurements: amplitude, interference phase, polarization and Doppler measurements.

It is assumed that interference phase, polarization and Doppler methods are characterized by very high measurement accuracy, which in some very unique devices may be up to several one/hundreds of the light wave length. The disadvantage of these methods is their very high complexity and as a result thereof, the high cost of such measuring devices based on these principles, making them rather unique to be used widely in industry and in everyday life. The devices measuring amplitude are, on the other hand, very simple.

Sensing devices, utilized as a microphone, comprising two optical fibers affixed at a certain angle to each other and distant from a membrane are known. The input fiber transmits light energy onto the membrane, while the output fiber transmits the light reflected from the membrane out of the microphone. The problem with this construction is the demand that both the input and output fibers have to be accurately placed in the same plane and perpendicular to the plane of the membrane. Even the smallest deviation therefrom leads to a substantial decrease in the microphone sensitivity.

Others have tried to use a construction of a multiplicity of optical fibers collected into a parallel bundle disposed perpendicularly to a microphone membrane. In this construction, half of fibers are used to transmit light onto the membrane while the other half are used to collect the reflected light and transmit same out of the microphone. This construction does not require as strict a fiber orientation as the previous one, however, it does require a substantial number of fibers and this involves tedious precision work for preparing, processing and polishing same. Therefore, such a construction of a microphone is very complex, costly and ineffective, as the sensitivity thereof is less than 0.01% per micron of membrane movement.

It is therefore a broad object of the present invention to provide a relatively non-complex fiber optic sensor adapted to be utilized in conjunction with a medium, the distances and/or physical properties of which are to be measured.

It is a further broad object of the present invention to provide methods of calculating variations in distances and/or physical properties of a medium utilizing fiber optic sensors structured in accordance with certain principles.

According to the present invention there is therefore provided a sensor for sensing the distances to a medium and/or the physical properties thereof, comprising a housing, at least one pair of optical fibers, each having an input end portion and an output end portion; the input end portion of a first fiber being connectable to a source of light and the output end portion of a second fiber being connectable to light intensity measuring means; a sensor head, including said input and output end portions, wherein each of the output portion of said first fiber and input end portion of said second fiber having an axis and a rim, said rim being cut at an angle $\Theta$ with respect to said axis and being affixedly located in a plane at least in proximity to, and facing each other, so as to include an angle $\alpha$ between the axes thereof, the arrangement being such that, upon operation, the light emerging from the output end portion of said first fiber impinges on a surface of a medium, at an angle of incidence $\beta$, and wherein $\beta = f(\alpha, \Theta)$.

The invention further provides a method of at least indirectly measuring distances to, and/or physical properties of, a medium, comprising providing a housing, at least one pair of optical fibers, each having an input end portion and an output end portion, the input end portion of a first fiber being connected to a source of light and the output end portion of a second fiber being connected to light intensity measuring means, a sensor head, including said input and output end portions, wherein each of the output portion of said first fiber and input end portion of said second fiber having an axis and a rim, said rim being cut at an angle $\Theta$ with respect to said axis and being affixedly located in a plane at least in proximity to, and facing each other, so as to include an angle $\alpha$ between the axes thereof, affixing a medium, the distances to, and/or physical properties of, which are to be measured in proximity to said sensor head; illuminating said medium with light and measuring the intensity of the reflected light, and calculating the distances as a function of the output light intensity I by the formula:

$$L \approx A_o \tan \beta / \phi \cdot l_n(I_o/I)$$

wherein:

$I_o$ is the input light intensity;

I is the output light intensity $A_o$ is a coefficient of proportionality;

L is the distance between the sensor's head and said medium;

$\beta$ is the angle of incidence, $\beta = f(\alpha, \Theta)$, and $\phi$ is the diameter of the fibers.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1:
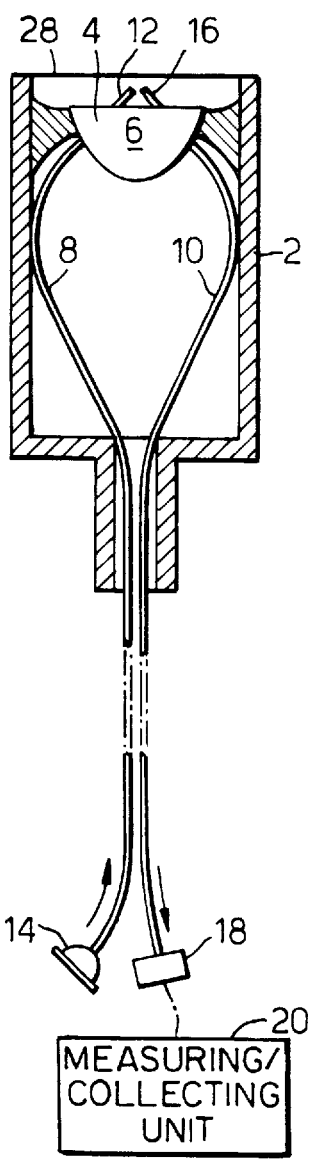
FIG. 1 is a schematic partly cross-sectional view of a sensor structured in accordance with a first embodiment of the present invention.
Figure 2:
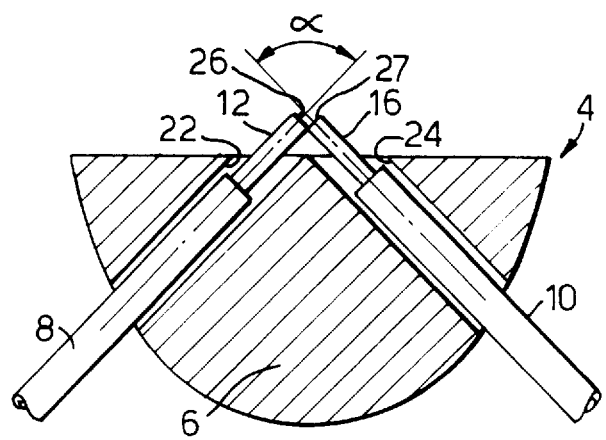
FIG. 2 is a side view of a first embodiment of a sensor head utilizable in the sensor of FIG. 1.
Figure 3:
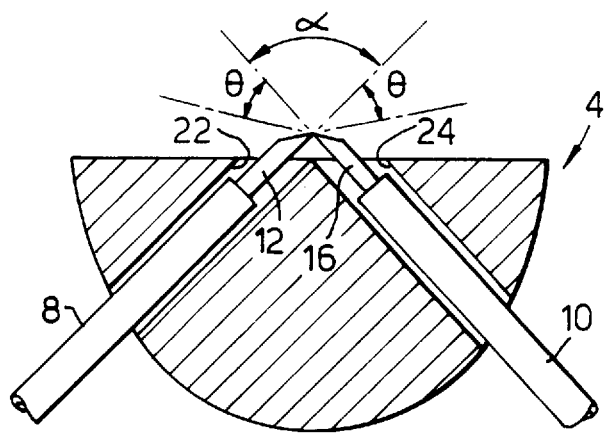
FIG. 3 is a side view of a second embodiment of a sensor head utilizable with the sensor of FIG. 1.

There is shown in FIGS. 1 to 3 a sensor according to the present invention, comprising a housing 2 accommodating a sensor head 4 including a base 6 serving to mount a pair of optical fibers 8 and 10. The fiber 8 has an output end portion 12 and is connectable at its other end to a light source 14, while the fiber 10 has an input end portion 16 and is connectable at its other end to a light intensity sensing means 18 which, in turn is connectable to a measuring/calculating unit 20.

As shown in greater detail in FIGS. 2 and 3, the base 6 of the sensor head may be constituted by any rigid or semi-rigid material affixable inside the housing 2, in which there are formed two suitable throughgoing holes 22, 24, each sized to hold, by pressure fit or otherwise, a single optical fiber. The direction of the axes of the holes 22, 24 are such that the end portions 12 and 16 are affixedly located at least in proximity to each other or touch each other at the rims 26, 27 thereof (see FIG. 2), as well as interface. The interfacing between the end portions should form an angle α between the traversing axis of the fibers. In cases where the end portions of the fibers do not touch each other, the gap separating the end portions should be less than a quarter of the diameter of the fiber.

Alternatively, for reasons which will become more apparent hereinafter, the rims 26, 27 of the end portions 12 and 16 of the fibers may be cut at an angle θ with respect to the axis of the fibers as shown in FIG. 3. Obviously, a single housing 2 may accommodate more than one pair of fibers, whether mounted on a single base or on separate bases. Similarly, a single light source or a plurality of light sources may be used for one sensor.

Further seen in FIG. 1 is a medium 28, e.g., a membrane, stretched across the housing 2 close to the end portions 12 and 16 of the fiber, the distances to, and/or physical properties of, which are to be measured by the sensor. The distance between the sensor's head 4 to the surface of a measured medium, constituting a plane of incidence, 28 and the angles α and θ will determine the angle of incidence β. Instead of moving the entire head with respect to the surface of a medium, in order to change the angle of incidence β, it is sufficient to slide both fibers 8 and 10 inside the holes 22 and 24, so that the tips thereof will assume a closer or further position with respect to the medium.

The equation that connects the output light signal intensity I with the change of measurement distance L and the angle of incidence β is:

$$I \approx I_o \exp[L\phi/A_o \tan \beta] \quad (1)$$

where:

$I_o$ is the input light intensity;

$A_o$ is a proportional coefficient;

L is the distance from optical fibers to a medium to be measured;

β is an incidence angle, $\beta = f(\alpha a, \Theta)$ where α is an angle between the axes of the optical fibers, and Θ is an angle at which the rims of the end portions of the fibers are cut, and φ is the diameter of the optical fibers.

The relative change of the output light for every distance from a plane "pl" of a medium for a unit distance ΔL is given by the equation:

$$(I/I_o)\text{pl}/\Delta L = \Delta I_{pl}/\Delta L = [1 - \phi/A_o \tan \beta \exp L\phi/A_o \tan \beta] \quad (2)$$

where:

ΔL is a measurement of a distance change to a plane of the medium;

$\Delta I_{pl}$ is a relative change of the output light intensity.

The relative change thus depends on incident angle β and on optical fiber diameter φ only.

Figure 4:
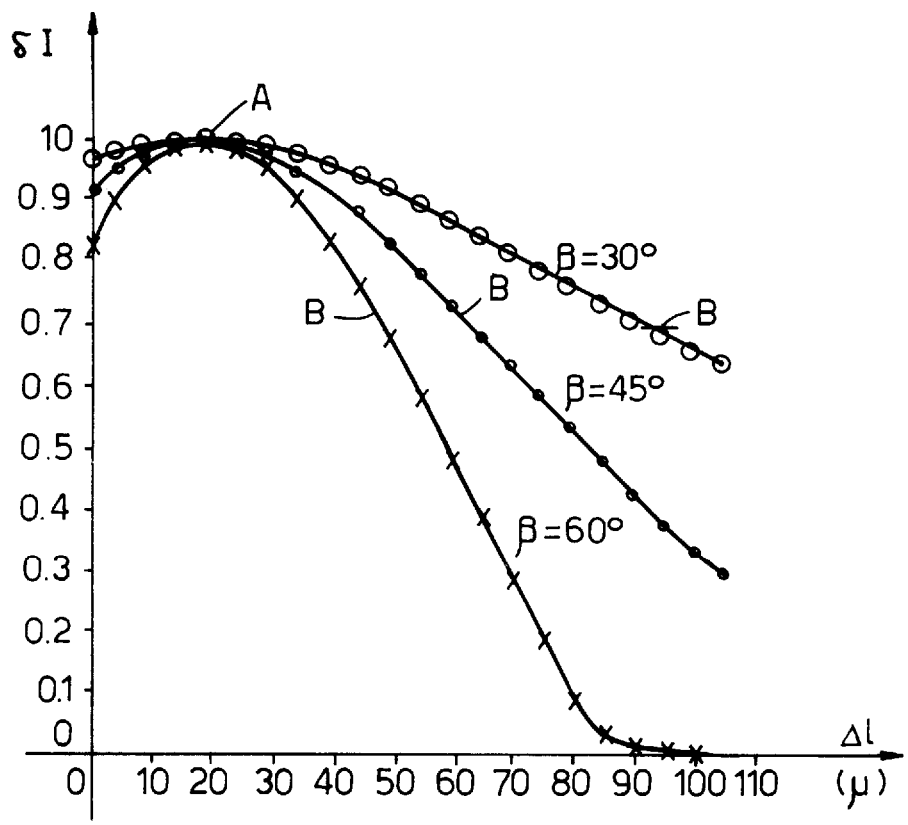
FIG. 4 are characteristic curves showing variations in light intensity for different angles of incidence.

FIG. 4 shows this dependency for different incident angles from β=30° to β=60°.

As is understood, the configuration of the ends of the fibers 12 and 16 (see FIGS. 2 and 3) will also affect the angle of incidence β.

In cases of low frequency measurement devices, such as pressure sensors, temperature sensors, scales, tension sensors and the like, or in cases of construction of high stability calibrated sensors, a high stability output signal that will not depend on temperature change of output intensity of the light source and on the light detector, is required. To diminish this dependency, an ouput signal of a second pair of optical fibers can be used as a reference signal to normalize the output signal of the first pair of optical fibers. In this case, the second pair of fibers is focused on another point of the medium to be measured. The first pair is focused on a point on the surface of the medium, so as to obtain the highest signal sensitivity—see point B on the characteristic curves of FIG. 4. The second pair is focused on a point on the medium surface so as to provide a higher output signal—see Point A on the characteristic curves of FIG. 4. Since at Point A sensitivity of the sensor is very poor, the output signal of the second pair will cause only a very small change if the distance to the medium is changed. At the same time the output signal at Point A will change drastically when the input signal changes.

As further seen in FIG. 4, at Points B, the sensitivity of a sensor is the highest and every change of a distance results most effectively in a change of an output of the first pair. A change in the output signal will be proportional to the change of the input light intensity as well. Thus, the relationship between the output signals $I_B$ and $I_A$ will give an absolute value of the measured distance in accordance with equation (2) that would not depend on temperature, optical fiber line length and other factors.

There is another possible manner to raise the sensor's sensitivity. If a medium, e.g., a membrane, has a spherical surface sp (See FIG. 5), the equation (2) will be in the form:

$$\Delta I_{sp}/\Delta L = (\Delta I_{pl}/\Delta L)L[1 + 2\phi/r \cdot (\cos^2 \beta)] \quad (3)$$

where:

$\delta L_{pl}/\Delta L$ is given by equation (2), and r is the radius of the spherical surface.

Figure 6:
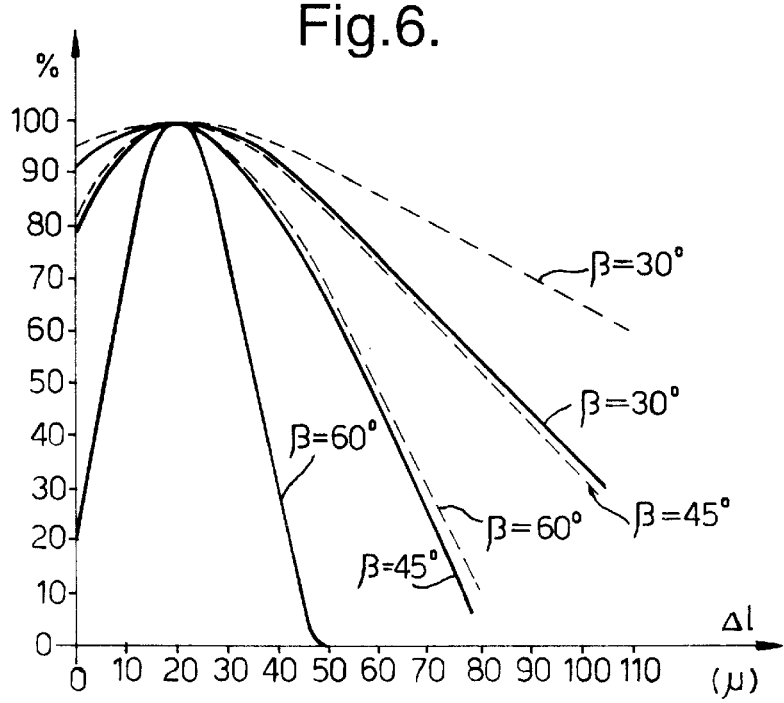
FIG. 6 are characteristic curves showing dependence of sensor's sensitivity on angle of incidence for a medium of FIG. 5.

FIG. 6 shows the last relationship in the event that $2\phi/r=1$ for different incident angles from $\beta=30°$ to $\beta=60°$. Dashed lines of the curves represent dependencies when $r=\infty$ (a planar membrane).

One can see that in the case of a spherical membrane, when the radius of the sphere is substantially the same as the diameter of the optical fiber, sensor sensitivity will grow very fast with an increase in the incident angle. This enables increasing the sensor's sensitivity by more than ten times.

Figure 5:
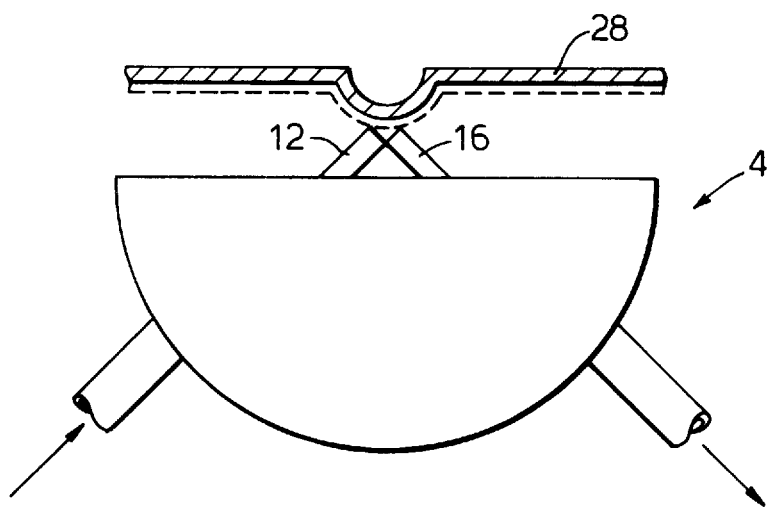
FIG. 5 is a side and partial cross-sectional view of a sensor head and a shaped medium.

The embodiment of FIG. 1 is utilizable as a microphone, the sensitivity of which can be increased by employing a membrane shaped as shown in FIG. 5.

Figure 7:
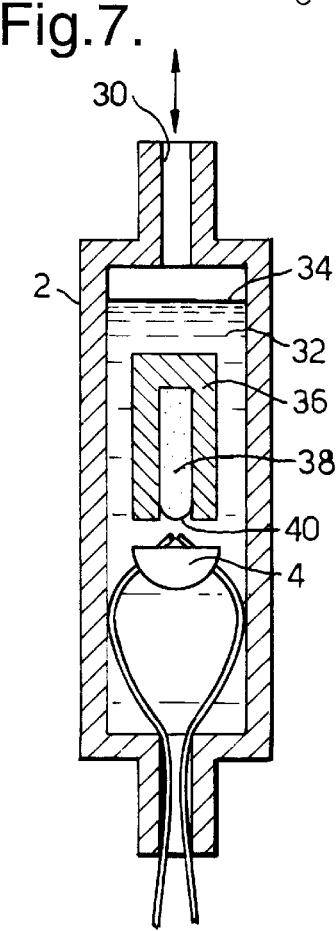
FIG. 7 is a cross-sectional view of a sensor according to the present invention, as utilized as a hydrophone.

When the sensor of the present invention is to be utilized as a hydrophone, a device as shown in FIG. 7 is used. In this case, the housing 2 has an opening 30 and is filled with liquid 32. A diaphragm 34 disposed above the liquid prevents the liquid from flowing out of the opening 30. Suspended in the liquid 32, above the sensor head 4, is a small capillary tube 36 confining a gas 38, e.g., air, having a small spherical surface 40 adjacent to the sensor head 4. Changes in pressure applied on the membrane 34 will cause movements in the surface 40, which movements will be detected or sensed and measured by the sensor.

Figure 8:
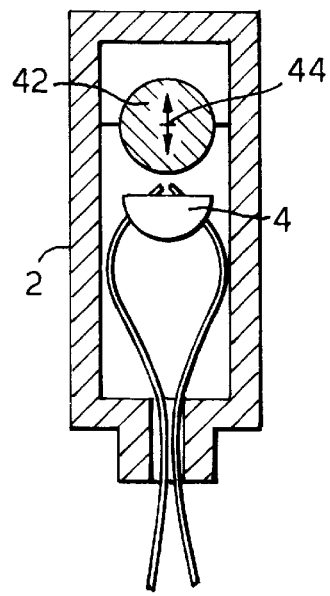
FIG. 8 is a cross-sectional view of a sensor according to the present invention, as utilized as an accelerometer.

In FIG. 8 there is illustrated a sensor used as an accelerometer. Inside the housing there is rotationally hinged a disk 42 having in the center thereof an inertial body, e.g, a ball 44, made of relatively heavy material, such as metal. The surface of the ball acts as a spherical surface upon which the light from head 4 is impinged. Instead of a disk 42, the ball 44 may be disposed inside the housing by a spring.

Figure 9:
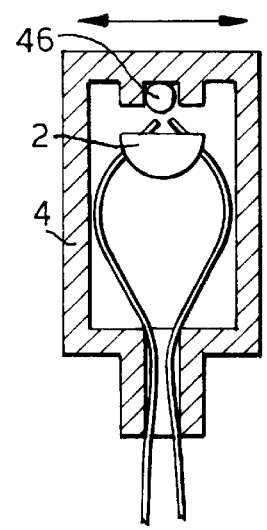
FIG. 9 is a cross-sectional view of a sensor showing a further embodiment as can be utilized as an accelerometer.

A modification of the accelerometer of FIG. 8 is illustrated in FIG. 9. Here, the medium to be measured is a small drop of mercury 46, which, due to its properties, provides a highly sensitive surface resulting in a sensitive sensor.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A sensor for sensing the distances to a medium and/or the physical properties thereof, comprising:

a housing;

at least one pair of optical fibers, each having an input end portion and an output end portion;

the input end portion of a first fiber being connectable to a source of light and the output end portion of a second fiber being connectable to light intensity measuring means;

a sensor head, including said input end portion of said second optical fiber and said output end portion of said first optical fiber affixedly located at least in proximity to each other, wherein each of the output end portion of said first fiber and input end portion of said second fiber having an axis and a rim, said rims being cut at an angle $\theta$ with respect to said axis and said axes forming an angle $\alpha$ therebetween, the arrangement being such that, upon operation, the light emerging from the output end portion of said first fiber impinges on a surface of a medium, at an angle of incidence $\beta$, and wherein $\beta=f(\alpha, \theta)$.

2. The sensor as claimed in claim 1, wherein the output end of said first fiber and the input end of said second fiber are mounted inside said housing with their rims touching each other.

3. The sensor as claimed in claim 2, wherein the output end of said first fiber and the input end of said second fiber are mounted inside said housing at a distance from said surface, which distance is less than a quarter of their diameter.

4. The sensor as claimed in claim 1, further comprising a medium, said medium being at least indirectly engaged with said housing and having a surface directed towards said sensor head.

5. The sensor as claimed in claim 4, wherein said surface is planar or spherical.

6. The sensor as claimed in claim 1, wherein said medium is a flexible membrane.

7. The sensor as claimed in claim 1, wherein said medium is a rigid or semi-rigid body.

8. The sensor as claimed in claim 7, wherein said rigid or semi-rigid body is loaded in order to increase the inertial properties thereof.

9. The sensor as claimed in claim 1, wherein said medium is a gas bubble disposed in a liquid.

10. The sensor as claimed in claim 1, wherein said medium is a body of a known thermal coefficient.

11. The sensor as claimed in claim 1, wherein said medium is a drop of liquid.

12. The sensor as claimed in claim 10, wherein said drop of liquid is disposed in a capilliary tube.

13. The sensor as claimed in claim 1, wherein said medium is a body the configuration of which changes under the influence of a force applied thereon.

14. The sensor as claimed in claim 1, wherein said housing is a sealed housing preventing light and fluid from entering thereinto or exiting therefrom.

15. The sensor as claimed in claim 1, wherein said housing is provided with a port leading to the outside, the housing being at least partly filled with fluid and means are provided to prevent said fluid from exiting said port.

16. A method of at least indirectly measuring distances to, and/or physical properties of, a medium, comprising:

providing a housing, at least one pair of optical fibers, each having an input end portion and an output end portion, the input end portion of a first fiber being connected to a source of light and the output end portion of a second fiber being connected to light intensity measuring means, and a sensor head, including said input end portion of said second optical fiber and said output end portion of said first optical fiber affixedly located at least in proximity to each other, wherein each of the output end portion of said first fiber and input end portion of said second fiber having an axis and a rim, said rims being cut at an angle $\theta$ with respect to said axis and said axes forming an angle $\alpha$ therebetween, affixing a medium, the distances to, and/or physical properties of, which are to be measured in proximity to said sensor head;

illuminating said medium with light and measuring the intensity of the reflected light, and calculating the distances as a function of the output light intensity I by the formula:

$$L \approx A_o \tan \beta / \phi \cdot 1_n(I_o/I)$$

wherein:

$I_o$ is the input light intensity;

$I$ is the output light intensity;

$A_o$ is a coefficient of proportionality;

L is the distance between the sensor's head and said medium;

$\beta$ is the angle of incidence, $\beta = f(\alpha, \theta)$, and $\phi$ is the diameter of the fibers.

17. The method as claimed in claim 16, further comprising calculating the absolute value of said distances, by the formula:

$$(I/I_o)_{pt}/\Delta L = \Delta I_{pt}/\Delta L \approx [1 - \phi/A_o \tan \beta] \exp[L\phi/A_o \tan \beta].$$

18. The method as claimed in claim 16, further comprising calculating the relative change or absolute distance L between said sensor head and a medium having a spherical surface, by the formula:

$$\Delta I_{sp}/\Delta L = (\Delta I_{pt}/\Delta L\ [1 + 2\phi/r \cdot (\cos^2 \beta)]$$

wherein:

r is the radius of the spherical surface.

* * * * *